United States Patent [19]

Akhtyamov

[11] Patent Number: 4,519,777
[45] Date of Patent: May 28, 1985

[54] METHOD AND APPARATUS FOR BLOATING GRANULAR MATERIAL

[76] Inventor: Yakub A. Akhtyamov, ulitsa Lipetskaya, 17, kv. 16, Chelyabinsk, U.S.S.R.

[21] Appl. No.: 415,775

[22] Filed: Sep. 8, 1982

[51] Int. Cl.³ .................. F27B 14/00; F27D 1/08; C04B 31/22
[52] U.S. Cl. .......................... 432/13; 432/96
[58] Field of Search .................. 432/13, 95, 96; 252/378 R, 378 P; 106/DIG. 2

[56] References Cited

U.S. PATENT DOCUMENTS

| | | | |
|---|---|---|---|
| 2,306,462 | 12/1942 | Moorman | 432/13 |
| 2,431,884 | 12/1947 | Neuschotz | 432/13 |
| 2,600,963 | 6/1952 | Bland | 432/13 |
| 3,216,125 | 11/1965 | Dennert | 432/13 |
| 4,347,155 | 8/1982 | Jenkins | 252/378 P |

Primary Examiner—John J. Camby
Attorney, Agent, or Firm—Ladas & Parry

[57] ABSTRACT

A method of bloating a granular material residing in that a flow of rising gases heated to a temperature of 800°–1000° C. is formed, and a flow of raw granular material is formed to be introduced directly into said flow of rising gases at a velocity 1.5 to 9 times the velocity of rising gases, whereafter said material is roasted to obtain completely or partially bloated granules which are carried by the flow of exit gases away from the zone of roasting. The partially bloated granules of said material are returned to the zone of roasting to roast further until they are completely bloated.

A unit for carrying out this method comprises a vertical furnace for bloating the raw granular material having a chamber the walls of which in the upper portion thereof in the zone of outlet of the bloated granular material are defined by inclined planes having an angle of inclination in excess of the natural angle of repose of the material, a reflector fashioned as a dihedron, a means for feeding the raw granular material, and pockets for collecting the bloated granular material connected to a settling chamber for the bloated material to settle in.

11 Claims, 2 Drawing Figures

METHOD AND APPARATUS FOR BLOATING GRANULAR MATERIAL

FIELD OF THE INVENTION

This invention relates to the art of making building materials, and more particularly to a method of obtaining a bloated granular material and a unit for effecting such a method.

The thus obtained bloated material can find application in metallurgy, machine building, agriculture, etc.

BACKGROUND OF THE INVENTION

There is now known a method of bloating a granular material to be effected in a shaft furnace (cf. "Proizvodstvo i primenenie vernikulita"—in Russian, Edited by Popov, Published by Stroiizdat, Moscow, 1964; and "Spravochnik po proizvodstvu teploizolyatsionnykh i akusticheskikh materialov"—in Russian, Edited by Kitaitsev, Published by Stroiizdat, Moscow, 1964, p. 280) residing in that raw vermiculite is admitted in countercurrent to the flow of hot gases for the thus supplied vermiculite to be roasted at a temperature of 800° to 1000° C. and be bloated, whereafter the bloated granules tend to fall by gravity to the lower part of the chamber of the furnace for the end product to be discharged therefrom.

In such a bloating process bloating of the vermiculite granules largely depends on the duration of their staying in the zone of high temperature, whereby during uniform heating conditions larger granules tend to underbloat, while smaller ones overroast.

Because vermiculite is supplied in countercurrent to the less heated upper portion of the flow of heated gases, it bloats less efficiently.

For the above reasons the raw vermiculite is subjected to preliminary sizing to 4-6 narrow fractions, the fractions of over 2.5 mm being further sized to 0.5 mm. Each of the thus sized fractions is then subjected separately to roasting, temperature conditions being selected accordingly.

The thus obtained bloated vermiculite is too brittle due to the presence therein of overroasted small granules, the bloating rate thereof being within a range of from 5 to 6.

A shaft furnace wherein this method is carried out is provided with a lined vertical chamber of 12 m in height and up to 1 m in diameter, the lower portion of this chamber accommodating a means for burning a fuel and discharging the end product; the upper portion thereof accommodating a means for discharging combustion products and supplying the raw material. The chambers are provided with inclined trays for the raw vermiculite to stay longer in the high temperature zone.

With the number of fractions being roasted ranging from 4 to 6, there are provided a corresponding number of containers of sufficient capacity for storing such fractions and separate admission thereof to the shaft furnace. A like number of tanks and conveyors are required for receiving the end product.

The above furnace is inherently disadvantageous in low end product output and much materials consumed for its manufacture.

There is further known a method of obtaining a bloated material of the vermiculite type (cf. USSR Inventor's Certificate No. 187,605) residing in that a flow of rising gases heated to a temperature of 800°-1000° C. and a flow of raw granular material are formed, whereafter said material is subjected to roasting by virtue of heat transfer between this material and the rising flow of gases to thereby obtain a bloated material. The time of presence of the granules in the zone of high temperature is determined by the height at which the particles of the material being bloated ascend in the flow of gases, the height being determined by varying the pressure of compressed air forming this flow. The thus obtained material consisting of completely bloated, partially bloated, and non-bloated granules is pneumatically conveyed together with exit gases away from the zone of roasting.

A unit for carrying out the above method comprises:
a vertical furnace for bloating the granular material;
a housing of said furnace;
a chamber disposed axially in said housing of said furnace lengthwise thereof;
a reflector fashioned as a cone and located to overlie the chamber coaxially relative to its vertical centerline;
a burner of streamlined shape for combusting a fuel arranged inside a nozzle for feeding the granular raw material and mounted at a lower end of the chamber coaxially with the vertical centerline thereof; and
collector pockets disposed concentrically adjacent to an upper end of the furnace chamber.

When the raw vermiculite is pneumatically conveyed upwards of the furnace chamber, the velocity of the gas flow and the velocity of the raw material supplied are practically equal, whereby it is impossible to introduce various size fractions of the raw material to various required heights for efficient bloating. At a velocity sufficient for the larger granules to reach the necessary height relative to the conical reflector, medium size granules are entrained by the bloated granules short of getting bloated.

Larger granules fail to stay suspended in the furnace chamber even at a considerable length thereof (up to 6 m) whereby they fall down to the lower portion of the chamber short of being bloated. For more efficient bloating of the larger granules, it is possible to increase temperature in the furnace chamber to over 1000° C., although this leads to overroasting of the small size granules.

The resulting mixture comprises bloated and non-bloated vermiculite granules of relatively low quality with a low output in terms of overall volume.

During pneumatically conveying the granules of the raw material by the flow of hot gases the conical reflector serves to exclusively to direct this flow and the mixture of completely and partially bloated vermiculite granules into the collector pockets, which affects the quality of the end product.

Also, a large volumetric amount of gases is required for conveying vermiculite along the furnace chamber; a subsequent cleaning of these gases from pulverulent vermiculite requiring the use of complicated devices.

Further, the aforedescribed unit features a relatively low efficiency, while a considerable amount of materials needs to be consumed for its manufacture.

OBJECTS OF THE INVENTION

It is therefore an object of this invention to provide a method of bloating a granular material which would improve the quality of the end product, simplify the process flow and increase its efficiency.

Another object is to provide a unit for carrying out the above method which would be highly efficient and

SUMMARY OF THE INVENTION

The objects of the present invention are attained in a method of bloating a granular material residing in that a flow of rising gases heated to a temperature of 800°–1000° C. is formed, and a flow of the raw granular material is formed to be introduced directly into the flow of the rising gases at a velocity 1.5 to 9 times the velocity of the rising gases, whereafter said raw material is roasted to obtain completely and partially bloated granules thereof which are then carried by the flow of exit gases away from the zone of roasting for separation, the partially bloated granules of the material being returned to the zone of roasting to complete bloating.

The objects of the invention are further attained in a unit for carrying out the proposed method, the unit comprising:

a vertical furnace for bloating the granular material;

a housing of said furnace;

a chamber disposed coaxially inside said housing of said furnace lengthwise thereof, walls of the chamber in the upper portion thereof adjacent a zone of outlet of the bloated granular material being defined by inclined planes the inclination angle of which is in excess of the natural angle of repose of said material;

a reflector having the form of a dihedron and disposed to overlie the chamber coaxially relative to its vertical centerline;

a fuel burner disposed at a lower end of said chamber;

a means for feeding the raw granular material located at the lower end of said chamber;

a settling chamber for the bloated material to settle in; and pockets for collecting the bloated granular material disposed symmetrically relative to the vertical centerline of the chamber in the zone of outlet of the thus obtained bloated granular material from the chamber, the pockets being connected to the lower portion of the settling chamber on the side from which the end product is discharged.

The proposed method ensures:

a high rate of bloating due to efficient heating of the granules of the raw material resulting from a considerable velocity gradient between the granules and the flow of hot gases;

absence of overroasting of the small size granules due to that the bloated granules are immediately and selectively carried by the controllable flow of rising gases away from the high temperature zone;

a uniform and complete bloating of granules of any size thanks to a possibility of returning the larger size granules to the high temperature zone to complete the bloating process, resulting in a more efficient bloating method.

Preferably, a raw granular material of 0 to 10 mm size fraction is used to simplify the process and reduce the cost price of the end product.

Preferably, vermiculite or perlite is used as the raw granular material.

Preferably, the flow of rising gases has a velocity of roughly between 4 and 9 m/s.

Such a velocity minimizes fragmentation and formation of pulverulent fractions, which ensures a high quality of the end product.

The herein proposed unit produces a high quality bloated granular material and features a high specific output.

Preferably, the means for feeding the raw granular material is fashioned as an ejector provided with a Laval nozzle to increase the efficiency of the unit.

DETAILED DESCRIPTION OF THE INVENTION

Figure 1:
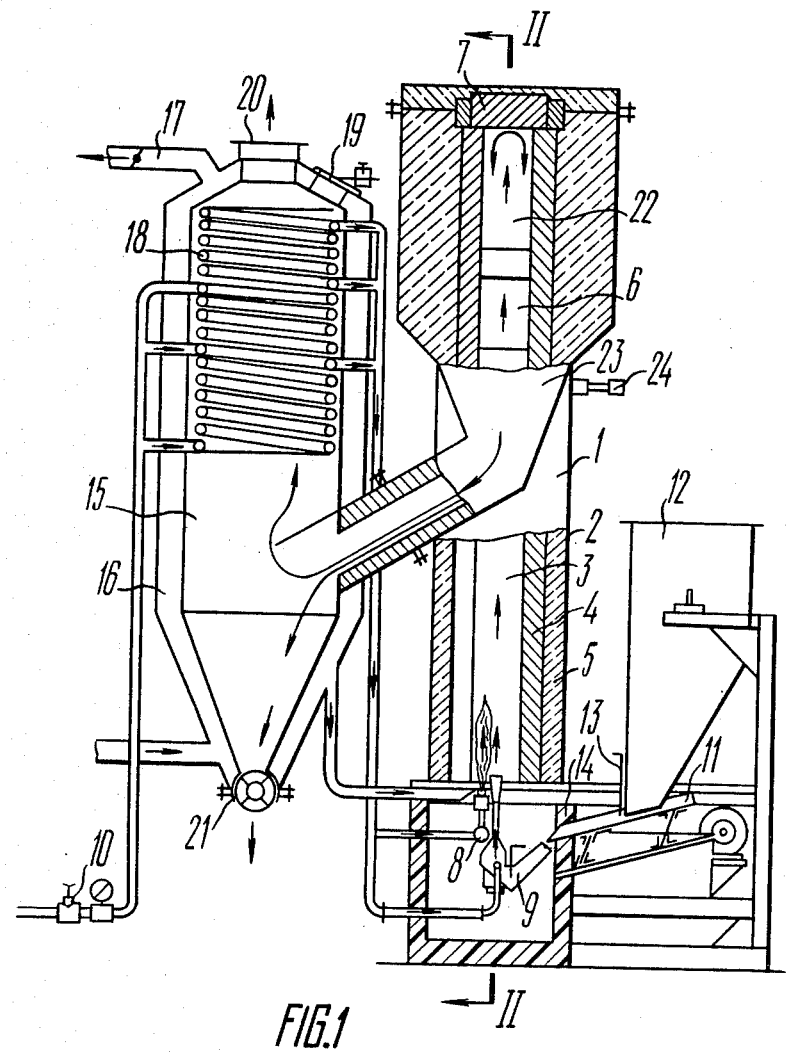

The method according to the invention is carried out in the following manner.

A flow of rising gases heated to a temperature of 800°–1000° C. is formed by burning a fuel and directing the thus formed hot gases. Concurrently, a flow of raw granular material is formed, the raw material consisting for example from such minerals as vermiculite, perlite or the like. The flow of the raw granular material is introduced directly into the flow of rising hot gases at a velocity 1.5 to 9 times the velocity of the flow of rising hot gases. In the course of heat transfer between the two flows the raw material is subjected to roasting whereby a bloated material is formed consisting of completely bloated and partially bloated large granules of over 2.5 mm in size.

The temperature of the rising gases (800°–1000° C.) is chosen such as to optimize bloating of the large size granules and prevent overroasting of the small size granules of the raw material. The velocity of the flow of rising gases is selected within a range of between 4 to 9 m/s, depending on the quality of the raw material and the rate of bloating thereof.

The velocity of the flow of raw material is selected such as to impart to the granules (particularly to the granules of more than 2.5 mm in size) a sufficient kinetic energy to reach a height which ensures that they stay a sufficient length of time in the high temperature zone to increase the bloating rate, this rate being understood to mean a ratio between the volumetric mass of the bloated material and that of the raw granular material.

The thus produced velocity gradient between the two flows facilitates heating of the granules due to convective heat transfer resulting in an improved rate of bloating of the granular material.

The bloated granular end produt is carried along with exit gases away from the zone of roasting to be subjected to separation. Partially bloated granules are returned for further roasting to attain a more complete bloating and be entrained by the flow of exit gases and subsequent separation for the purpose of obtaining the end product.

The quality of bloated vermiculite is determined by the bloating rate, as well as the presence of overroasted brittle particles and pulverulent fractions.

The method according to the invention affords:

to prevent undue separation of the particles of the granular material into narrow size fractions due to uniform bloating and selective discharge of the bloated granules from the roasting zone;

to increase the bloating rate of the granular material to 7–8, that is by 30% versus the known method;

to bloat large granules of 3–5 mm in size without resorting to thickness sizing thereof down to 0.5 mm;

to reduce overall dimensions of the unit for effecting the method by returning large size bloated granules to the roasting zone, which makes the method more economical; and to increase the specific productivity of the method and make the method more fuel efficient.

Examples that follow represent best modes of carrying out the method according to the invention.

EXAMPLE 1

A fuel is subjected to combustion in a vertical furnace to form gases heated to a temperature of 800° C. and by controlling the rate of exhaust to further form a flow of rising gases moving at a velocity of 9 m/s. Introduced directly into this flow is a 60 m/s flow of raw vermiculite with fraction size of 0 to 10 mm fed at a rate of 600 kg/h.

In these conditions active roasting of the raw vermiculite takes place providing for complete bloating of 0-2.5 mm size fraction and partial bloating of 2.5-10 mm size fraction, the latter being continuously returned to the high temperature zone of the furnace chamber for further bloating.

The thus obtained bloated vermiculite having a volumetric mass of between 100 and 125 kg/m$^3$ is carried away along with exit gases for a further separation.

The end vermiculite product has a bloating rate of up to 8; it further has no overroasted small fractions and contains a minimum amount of pulverulent fractions.

EXAMPLE 2

A fuel is subjected to combustion in a vertical furnace to form gases heated to a temperature of 1000° C. and by controlling the rate of exhaust a flow of rising gases is formed moving at a velocity of 5 m/s. Introduced directly into this flow is a 7.5 m/s flow of perlite sand of 0-2.5 mm size fraction at a rate of 500 kg/h. In these conditions active roasting of the raw perlite takes place providing for complete bloating of 0-1 size fraction and partial bloating of 1-2.5 mm size fraction, the latter being continuously returned to the high temperature zone of the furnace chamber to complete bloating. The thus obtained bloating perlite having a volumetric mass of 70 kg/m$^3$ is carried away along with the flow of exit gases for a further separation. The end perlite product has a bloating rate of up to 12; it is also characterized by the absence of overroasted small fractions and contains a minimum amount of pulverulent fractions.

EXAMPLE 3

Heated gases are charged into a chamber of a vertical furnace heated to a temperature of 1000° C. by an electric heating means and by controlling the rate of exhaust a flow of rising hot gases moving at a velocity of 4 m/s is formed. A continuous flow of 0-5 mm size fraction raw vermiculite charged at a rate of 300 kg/h and having a velocity of 36 m/s is introduced directly into the flow of hot gases in said chamber. In these conditions active roasting of the raw vermiculite takes place providing for complete bloating of 0-2.5 mm size fraction and partial bloating of 2.5-5 mm size fraction, the latter being continuously returned to the roasting zone or the high temperature zone. The thus obtained bloated vermiculite having a volumetric mass of between 100 and 125 kg/m$^3$ is carried away along with the flow of exit gases for a further separation.

The end vermiculite product has a bloating rate of up to 8; it also features no overroasted small fractions and has a minimum amount of pulverulent fractions.

Figure 2:
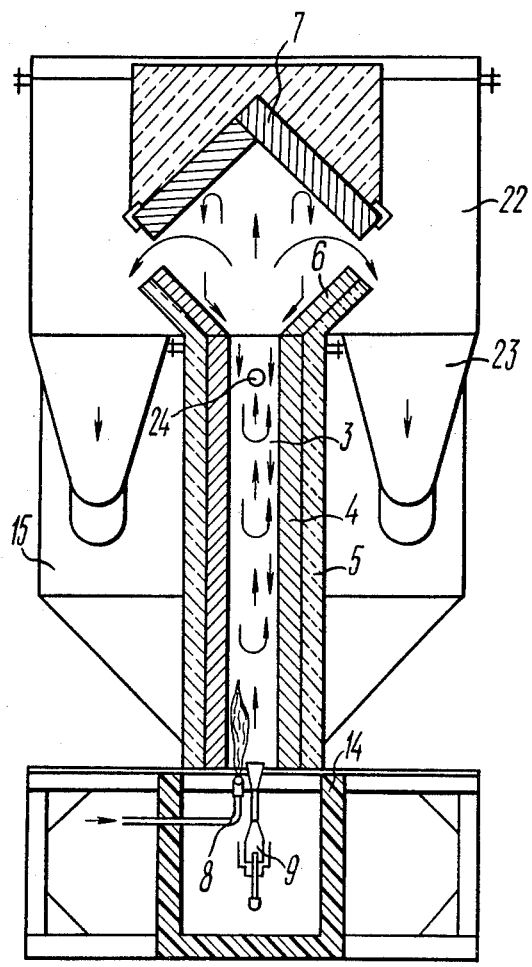

The invention will now be described in greater detail with reference to specific embodiments thereof taken in conjunction with the accompanying drawings, in which:

FIG. 1 shows schematically a unit for bloating a granular material according to the invention, a furnace thereof being shown in a partial longitudinal section; and FIG. 2 is a longitudinal sectional view of the furnace taken along the line II—II in FIG. 1.

A unit for bloating raw granular material comprises a vertical furnace 1 (FIG. 1) for bloating a granular material, a housing 2 of the furnace 1, and a chamber 3 disposed coaxially in the housing 2 of the furnace 1 lengthwise thereof. The chamber 3 has walls 4 fabricated from a fire-resistant material. A space between the walls 4 and the housing 2 is filled with a heat-insulating material 5. The walls 4 in the upper portion of the chamber 3 in the zone of outlet of the bloated granular material are defined by two inclined planes 6 (FIG. 2), the inclination angle being in excess of the natural angle of repose of the granular material. Disposed above the chamber 3 coaxially relative to the vertical axis thereof is a reflector 7 in the form of a dihedron. In order to increase the efficiency of the process during bloating of the raw granular material of more than 10 mm size fraction, the walls 4 in the upper part of the chamber 3 may be defined by four inclined planes, whereas the reflector 7 may have the shape of a pyramid (not shown). A burner 8 is disposed close to the lower end face of the chamber 3 (FIG. 1), the burner being intended for burning a fuel. Also located there is a means for continuously feeding the raw granular material fashioned as an ejector 9 provided with a Laval nozzle. This means may also be fashioned as a centrifugal pneumatic device or otherwise. The supply of pressurized air into the ejector 9 with the Laval nozzle and the burner 8 is controlled by valves 10 according to the readings of pressure gauges. By proportioning the amount of fuel and air stable burning and complete combustion of fuel is ensured. The raw material is conveyed from a hopper 12 along a vibrating chute 11 toward the ejector 9, the amount of the raw material supplied to the ejector 9 being controlled by a slide valve 13. A space underlying the furnace is sound-insulated by a sound-absorbing material 14.

The unit according to the invention is further provided with a means for settling the bloated material in the form of a settling chamber 15 provided with a cooling jacket 16. For reasons of fuel economy the air heated in the jacket 16 of the chamber 15 is partially conveyed into the lower portion of the chamber 3 of the furnace 2, and is partially discharged through a pipe 17. Cooling of the settling chamber 15 reduces the temperature of exhaust gases by 100°+200° C. thereby reducing the volume and ascent speed of these gases in the setting chamber and, as a consequence, bringing down the amount of dust produced by the end material, which makes it possible to considerably simplify dust collecting devices preventing pollution of the environment.

Arranged inside the settling chamber 15 is a tube coil 18 for cooling exit gases, as well as heating the air being ejected and supplied into the burner 8. The chamber 15 is provided in the upper portion thereof with an anti-explosion valve 19 and a duct 20 for letting out the exhaust gases, the lower portion of the chamber 15 comprising a feeder gate 21 adapted to continuously discharge the bloated granular material. With reference to FIG. 2, the zone of outlet of the bloated granular material from the chamber 3 comprises arranged substantially symmetrically relative to the vertical centerline of the chamber 3 pockets 22 for collecting the bloated material. The pockets 22 are connected with the lower portion of the settling chamber 15 on the side of the outlet of the bloated material by lined chutes 23 having an angle of inclination in excess of the natural slope angle of the bloated material. The chamber 3 is provided with a thermocouple 24 intended to monitor and control the temperature in this chamber, the thermocouple being wired to an electronic potentiometer (not shown).

The unit for bloating granulated material embodying the present invention operates as follows.

An exhaust system comprised of a plurality of cyclones and bag filters (not shown) and connected to the duct 20 of the settling chamber 15 is first switched on to establish therein an underpressure of 40 mm water column. Thereafter compressed air is fed into the ejector 9 with the Laval nozzle and the burner 8 at a pressure of 2 gage atmospheres. A ignition torch is then introduced into the chamber 3 of the vertical furnace 2 while a liquid or gaseous fuel at a pressure of 2 gage atmospheres is fed to the burner 8. The chamber 3 is warmed up to a temperature of 900°–1000° C., the temperature being monitored and controlled by the thermocouple 24 according to the readings of the electronic potentiometer. Concurrently, by adjusting exhaust through the duct 20, a flow of rising hot gases is formed in the chamber 3 with an ascent speed of 4 to 9 m/sec providing for the entrainment of only well bloated particles having a sufficient sailing capacity. Then a flow of the raw granulated material formed in the ejector 9 and conveyed from the hopper 12 by the vibrating chute 11 is introduced into the flow of the rising hot gases, the amount of the raw material fed being controlled by the slide valve 13. By adjusting the pressure of compressed air in the ejector 9 the speed of this flow is set at a value 1.5 to 9 times the speed of the flow of hot gases. As a result of heat transfer between these flows the granules of the raw material are roasted to provide a sufficient rate of bloating. The velocity gradient between these two flows ensures that the surface of the granules is cleaned of moisture and dust, as well as that the granules are efficiently heated and bloated. Such an efficient bloating of the raw material in a wide fractional range of between 0 to 10 mm without sizing the granules as to their thickness down to 0.5 mm is ensured by that when accelerated in the ejector 9 to high escape speeds, the granules of different mass are imparted various amounts of kinetic energy whereby they pass through the rising flow of hot gases at various heights. Therewith, small size fraction granules tend to immediately bloat and be carried by the flow of gas through the pockets 22 and chutes 23 into the settling chamber 15. Conversely, larger particles tend to fly a greater distance and be thrown against the reflector 7 and recoiling therefrom fall onto the inclined planes 6 to roll back into the chamber 3. As they get bloated, they acquire the required sailing capacity to be entrained by the flow of gases and carried through the pockets 22 and chutes 23 into the settling chamber 15.

The lined chutes 23 serve to elongate the chamber of the furnace 3 and extend the duration of heat treatment of the bloated particles thereby reducing their tendency to shrink during cooling.

Entrainment of the bloated granules by the exit gases along the chutes 23 downwards into the lower portion of the settling chamber 15 acts to reduce the amount of dust carried away into the atmosphere. Therewith, the outflowing gases are filtered by the bloated granules.

The thus obtained bloated granules are continuously discharged through the feeder gate 21 of the settling chamber 15.

The exit gases are cooled in the settling chamber 15 by the coil 18, compressed air supplied to the ejector 9 and burner 8 being heated to a temperature of 200° to 300° C., which enables to improve the fuel efficiency of the unit by 12%. The exit gases are conveyed through the duct 20 and the exhaust system into the atmosphere. In order to extend the service life of the settling chamber 15, optimize the sanitary working conditions, save the fuel and utilize heat of the exit gases, the settling chamber 15 is provided with the air jacket 16 wherefrom the heated air is partially conveyed through the chamber 3 of the furnace 2 and partially discharged through the pipe 17. Another purpose of the jacket 16 is to cool and reduce the volume of exit gases discharged which makes it possible to simplify the exhaust system.

Represented hereinbelow is a comparative table of the technical-and-economic ratings of the proposed unit and prior art units for obtaining bloated vermiculite.

| Nos 1 | Ratings 2 | Shaft furnaces of foreign manufacturers 3 | | Shaft furnace used in the USSR 4 | The "Kombain" unit 5 | The proposed unit 6 |
|---|---|---|---|---|---|---|
| 2 | Raw material | Vermiculate concentrate classified according to size and thickness of granules taken from the deposits of: | | Vermiculite concentrate | | |
| | | South Africa | USA | | | |
| 3 | Separately bloated fractions of the raw material, in mm | 0.5–1 1–2 2–6 6–12 | 0–1 1–2 2–6 6–12 | 0.5–5 5–10 | 0–10 | 0–10 |
| 4 | Working volume of the furnace, in m³ | 7 | 7 | 2.26 | 0.288 | 0.07 |

-continued

| Nos 1 | Ratings 2 | Shaft furnaces of foreign manufacturers 3 | Shaft furnace used in the USSR 4 | The "Kombain" unit 5 | The proposed unit 6 |
|---|---|---|---|---|---|
| 5 | Furnace output in terms of bloated vermiculite, in m³/h; in terms of the raw material, kg/h | 12-15<br>1200 | 10<br>1400 | 2.5<br>400 | 6-8<br>1300 | 4-6<br>550 |
| 6 | Yield of bloated vermiculite from 1 m³ of the working volume of the furnace, m³/h | 2.15 | 1.41 | 0.66 | 34 | 71 |
| 7 | Volumetric mass of the bloated vermiculite, kg/m³ | 60-80 | 100-150 | 125-200 | 65-100 | 60-125 |
| 8 | Output of pulverulent fraction of below 0.6 mm, % | — | — | — | 36,5 | 12 |
| 9 | Fuel consumed per 1 m³ of the bloated vermiculite, in kg | 28-30 | 28-30 | 16 | 5.0 | 6.6 |
| 10 | Size of the furnace chamber towards the travel of the bloated vermiculite, in m | 10 | 10 | 8 | 8 | 2 |
| 11 | Furnace weight, in t | 85 | 70 | 47.7 | 16.8 | 2.74 |

As can be seen from the above table, the unit according to the invention makes it possible:

to produce bloated vermiculite from a raw material of a wide fractional composition ranging from 0 to 10 mm without sizing larger fractions in thickness to 0.5 mm;

to ensure a bloating rate of 7 to 8, which corresponds to a volumetric mass of the bloated vermiculite of 125 kg/m³;

to increase the specific output of the unit to 70 m³ of bloated granular material per 1 m³ of working space of the furnace chamber;

to improve fuel efficiency of the unit; and to bring down the amount of materials consumed for the manufacture of the unit.

What I claim is:

1. A method of bloating granular material comprising the steps of:
   forming a flow of rising gases heated to a temperature of 800°-1000° C.;
   forming a flow of the raw granular material;
   said flow of the raw granular material being introduced directly into said flow of the rising gases heated to a temperature of 800°-1000° C. at a velocity which is 1.5 to 9 times the velocity of said flow of gases;
   roasting said raw granulated material to obtain bloated granules of said material, the resulting material comprising completely bloated and partially bloated granules;
   carrying the thus obtained bloated granular material by the flow of exit gases away from the zone of roasting for separation; and
   returning said partially bloated granules into the roasting zone for further roasting until they are completely bloated.

2. A method as defined in claim 1 wherein size fraction of said raw material ranges between 0 and 10 mm.

3. A method as defined in claim 2 wherein vermiculite is used as the raw granular material.

4. A method as defined in claim 2 wherein perlite is used as the raw granular material.

5. A method as defined in claim 1 wherein said flow of rising gases has a velocity ranging from 4 m/s to 9 m/s.

6. An apparatus for continuous bloating of a granular material comprising, a substantially vertical furnace for the granular material, said furnace having a housing and a chamber;
   a source of raw granular material connected with a lower portion of said chamber;
   said chamber being disposed inside of said housing substantially coaxially with a vertical axis of said furnace, said chamber having wall portions defining an inside zone thereof, said walls in an upper portion of the chamber defining inclined planes an inclination angle of which is in excess of a natural angle of repose of the granular material;
   reflector means having a dihedron configuration being positioned above said inclined planes of the walls so that an outlet for bloated material is defined between said reflector means and said inclined planes of the walls;
   means for feeding of a raw granular material in a direction substantially parallel to the vertical axis of the furnace positioned at a lower portion of said chamber;

means for producing a flow of hot gases in a direction substantially parallel to the vertical axis of the furnace, being located at a lower portion of said chamber;

at least one pocket means for collecting the bloated granular material having an inlet and outlet, said inlet of said pocket means being connected with said outlet of said chamber of the furnace, said outlet of said pocket means positioned at a lower portion thereof being connected with an inlet of a settling chamber; and said settling chamber being adapted to settle the bloated material thereinside, said settling chamber having a discharge means for discharging of the bloated granular material from the apparatus.

7. An apparatus for continuous bloating of a granular material as claimed in claim 6 wherein said pocket means has a longitudinal axis being substantially parallel to the vertical axis of said furnace.

8. An apparatus for continuous bloating of a granular material as claimed in claim 6 wherein said means for feeding the raw material in an ejector provided with a laval-type nozzle.

9. An apparatus as claimed in claim 6 wherein an arrangement for cooling of hot gases transferred from said chamber of the furnace to said settling chamber is provided inside of said settling chamber.

10. An apparatus as claimed in claim 9 wherein an exhaust system is provided at a top portion of the settling chamber to exhaust the hot gases to the atmosphere.

11. An apparatus as claimed in claim 6 wherein the settling chamber is provided with an arrangement for transferring of a heated air from said settling chamber to said chamber of the furnace.

* * * * *